United States Patent
Surnilla et al.

(10) Patent No.: US 11,480,123 B1
(45) Date of Patent: Oct. 25, 2022

(54) METHODS AND SYSTEM FOR STARTING AN ENGINE

(71) Applicant: Ford Global Technologies, LLC, Dearborn, MI (US)

(72) Inventors: Gopichandra Surnilla, West Bloomfield, MI (US); Chris Glugla, Macomb, MI (US); Chad Archer, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/302,789

(22) Filed: May 12, 2021

(51) Int. Cl.
| | |
|---|---|
| *F02D 41/06* | (2006.01) |
| *F02D 41/00* | (2006.01) |
| *F02D 37/02* | (2006.01) |
| *F02D 17/02* | (2006.01) |

(52) U.S. Cl.
CPC ........... *F02D 41/062* (2013.01); *F02D 17/02* (2013.01); *F02D 37/02* (2013.01); *F02D 41/0087* (2013.01); *F02D 2041/0012* (2013.01)

(58) Field of Classification Search
CPC ........ F02D 41/062; F02D 17/02; F02D 37/02; F02D 41/0087; F02D 2041/0012; F02D 41/068
USPC ................. 123/179.3, 179.4, 179.5
See application file for complete search history.

(56) References Cited

U.S. PATENT DOCUMENTS

| | | | | |
|---|---|---|---|---|
| 3,964,258 A | * | 6/1976 | Romano | F02D 21/08 60/284 |
| 4,009,695 A | * | 3/1977 | Ule | F02D 41/0002 123/179.5 |
| 4,622,939 A | | 11/1986 | Matekunas | |
| 4,744,244 A | | 5/1988 | Tanaka | |
| 5,398,502 A | * | 3/1995 | Watanabe | F02D 13/0207 60/284 |
| 5,482,017 A | * | 1/1996 | Brehob | F02D 41/064 123/299 |
| 5,801,499 A | * | 9/1998 | Tsuzuki | B60K 6/22 903/914 |
| 5,850,811 A | * | 12/1998 | Tomisawa | F02D 41/024 60/284 |
| 5,878,717 A | | 3/1999 | Zur Loye | |
| 6,032,753 A | * | 3/2000 | Yamazaki | B60L 15/20 903/905 |

(Continued)

FOREIGN PATENT DOCUMENTS

| | | | | |
|---|---|---|---|---|
| FR | 3029972 A1 | * | 6/2016 | ............ B60W 10/06 |
| JP | 2018197521 A | * | 12/2018 | |

OTHER PUBLICATIONS

Pettersson, A., "Toruqe estimation from in-cylinder pressure sensor for closed loop torque control," Masters of Electrical Engineering Thesis, Chalmers University of Technology, Depailnient of Signals and Systems, Division of Systems and Control, Sep. 2017, 57 pages.

*Primary Examiner* — Sizo B Vilakazi
*Assistant Examiner* — Brian R Kirby
(74) *Attorney, Agent, or Firm* — Vincent Mastrogiacomo; McCoy Russell LLP

(57) ABSTRACT

Systems and methods for starting an engine of a hybrid vehicle are described. In one example, the method uses the engine to generate larger amounts of thermal energy while the engine is rotated under power of an electric machine. The systems and methods described herein may be applied to series and parallel hybrid vehicles.

20 Claims, 4 Drawing Sheets

(56) References Cited

U.S. PATENT DOCUMENTS

| | | | | |
|---|---|---|---|---|
| 6,253,866 | B1* | 7/2001 | Kojima | B60W 20/00 180/165 |
| 6,550,239 | B2* | 4/2003 | Almkvist | F02D 41/062 60/284 |
| 6,564,763 | B2* | 5/2003 | Shiraishi | F02D 13/0253 123/90.15 |
| 6,626,154 | B1* | 9/2003 | Kanno | F02B 75/20 123/480 |
| 7,021,287 | B2 | 4/2006 | Zhu et al. | |
| 7,032,581 | B2 | 4/2006 | Gibson et al. | |
| 7,104,044 | B2* | 9/2006 | Moore | B60K 6/485 60/284 |
| 7,201,127 | B2 | 4/2007 | Rockwell et al. | |
| 7,778,767 | B2* | 8/2010 | Santoso | F02D 41/064 701/113 |
| 7,931,002 | B1* | 4/2011 | Gibson | F02D 41/065 123/179.5 |
| 8,499,734 | B2* | 8/2013 | Wang | B60W 20/10 123/179.3 |
| 9,759,135 | B2 | 9/2017 | Ulrey et al. | |
| 10,408,152 | B1 | 9/2019 | Sumilla et al. | |
| 10,626,816 | B2 | 4/2020 | Sumilla et al. | |
| 10,677,172 | B2 | 6/2020 | Ulrey et al. | |
| 10,882,511 | B2 | 1/2021 | Ulrey et al. | |
| 2001/0025486 | A1* | 10/2001 | Ogiso | F01L 9/20 60/285 |
| 2001/0027760 | A1* | 10/2001 | Tanaka | F02D 41/0087 123/90.11 |
| 2002/0161507 | A1* | 10/2002 | Fuse | B60W 10/06 701/112 |
| 2003/0183185 | A1* | 10/2003 | Sun | F02D 41/062 123/182.1 |
| 2004/0144363 | A1* | 7/2004 | Ament | B60W 20/20 180/65.285 |
| 2008/0092837 | A1* | 4/2008 | Roth | F01L 1/34409 123/90.17 |
| 2009/0018755 | A1* | 1/2009 | Inoue | F02D 13/0249 701/103 |
| 2009/0150059 | A1 | 6/2009 | Santoso et al. | |
| 2009/0199560 | A1* | 8/2009 | Maier | B60K 6/485 123/436 |
| 2010/0038158 | A1* | 2/2010 | Whitney | B60K 6/485 180/65.265 |
| 2013/0255606 | A1* | 10/2013 | Nishikiori | F02D 41/00 123/90.1 |
| 2017/0009667 | A1* | 1/2017 | Asami | F01L 13/0063 |
| 2018/0030908 | A1* | 2/2018 | Pursifull | F02D 35/023 |
| 2018/0134272 | A1* | 5/2018 | Doering | F02D 41/123 |
| 2020/0047741 | A1* | 2/2020 | Nose | B60K 6/24 |

* cited by examiner

METHODS AND SYSTEM FOR STARTING AN ENGINE

FIELD

The present description relates to methods and a system for starting an engine of a hybrid vehicle.

BACKGROUND AND SUMMARY

An engine may be started during vehicle operation to provide propulsive effort and to charge an electric energy storage device by way of providing torque to an electric machine. The engine may include an exhaust system and a catalyst. Exhaust gases from the engine maybe processed via the catalyst after the engine is started. However, if the catalyst is operating at less than a threshold temperature, the engine exhaust gas may flow through the catalyst with very little of the exhaust gas being converted to $CO_2$ and $H_2O$. The exhaust gases that pass through the catalyst may include regulated emissions and the regulated emissions that pass through the catalyst when the catalyst is operating at less than the threshold temperature may represent a majority of tailpipe emissions produced by the engine during a vehicle drive. Therefore, it may be desirable to provide a way of reducing engine exhaust emissions that flow through the catalyst when the catalyst temperature is less than a threshold temperature.

The inventors herein have recognized the above-mentioned issues and have developed a method for starting an engine, comprising: rotating the engine unfueled at a speed and generating an intake manifold absolute pressure of the engine less than a threshold in response to an engine start request, the engine rotated via an electric machine; and after rotating the engine unfueled at the speed, supplying an amount of fuel to the engine and combusting the amount of fuel while rotating the engine at the speed, while the intake manifold pressure of the engine is less than the threshold, and while controlling torque of the engine such that torque of the engine is insufficient to maintain the engine at the speed.

By rotating an engine unfueled so that the engine's intake manifold absolute pressure (MAP) may be reduced before the engine is fueled, it may be possible to provide the technical result of starting the engine with reduced tailpipe emissions. In particular, reducing the engine's MAP may allow the engine to initially combust less fuel as compared to if the engine intake manifold was at barometric pressure. Further, the engine may be operated such that the engine may produce little if any torque output from the engine's crankshaft. Thus, a more significant amount of the fuel that is supplied to the engine may be applied to heat the engine's catalyst instead of generating torque. As a result, the increased thermal output of the engine may be applied to the exhaust system's catalyst so that the catalyst may reach operating temperature sooner. Consequently, the catalyst may begin converting engine output emissions sooner so that tailpipe emissions may be reduced.

The present description may provide several advantages. In particular, the approach may reduce tailpipe emissions. Further, the approach may reduce an amount of fuel used to heat a catalyst to operating temperature. In addition, the approach may reduce an amount of time it takes for a catalyst to reach light-off temperature.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
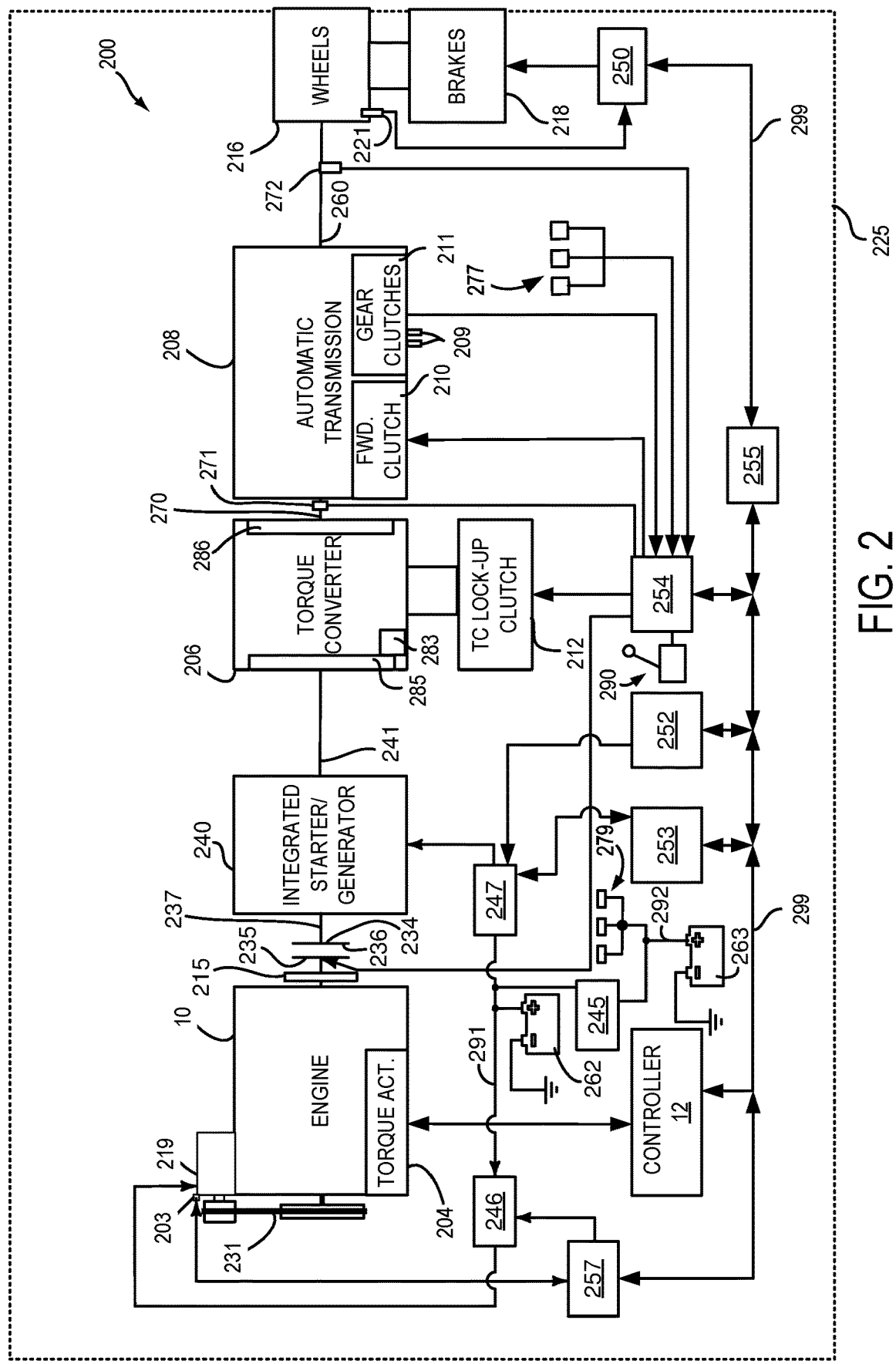
FIG. 2 is a schematic diagram of a vehicle driveline.
Figure 3:
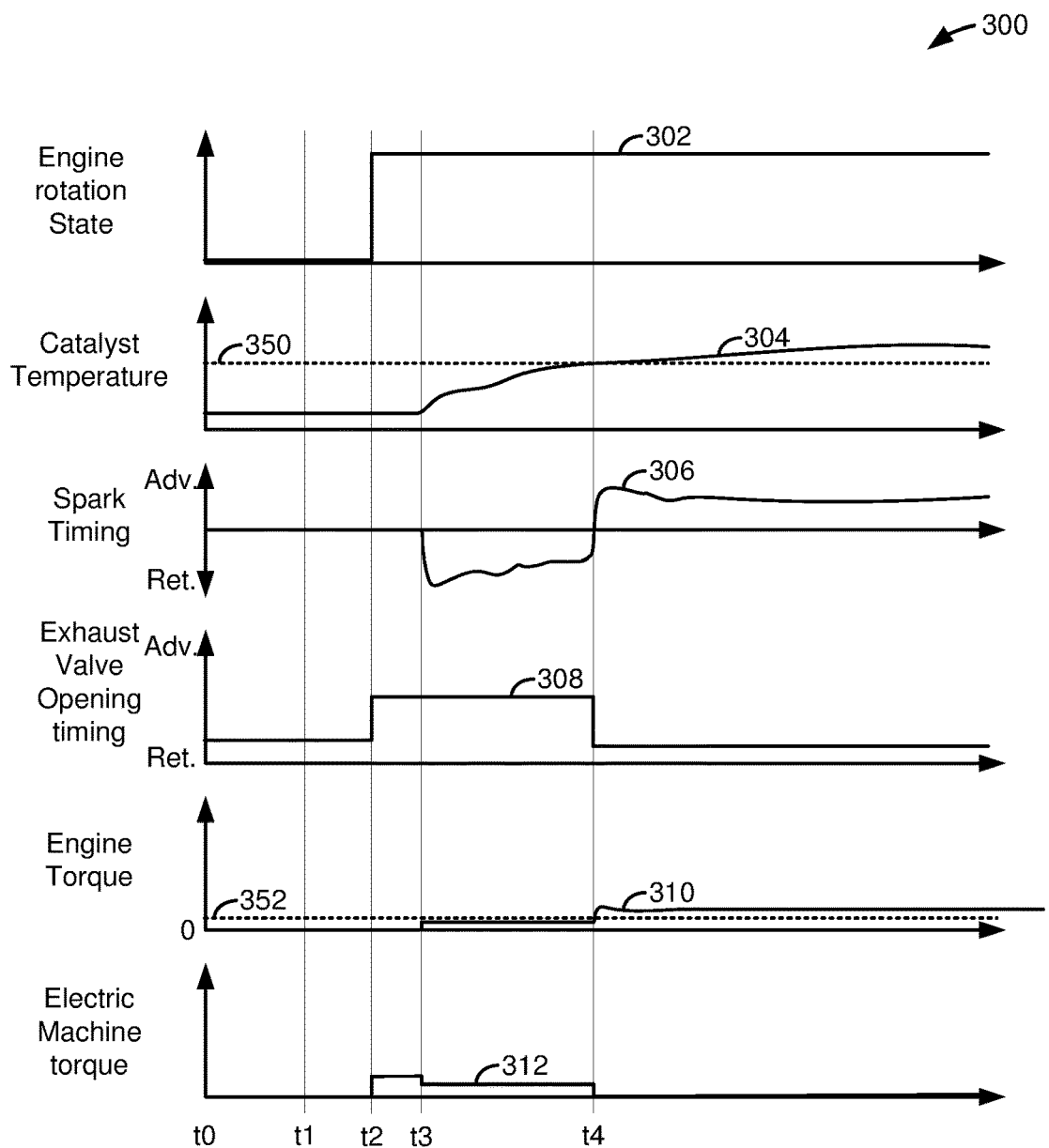
FIG. 3 shows example engine starting sequences according to the method of FIG. 4.

The present description is related to starting an engine. The engine may be started by first rotating the engine unfueled so that MAP may be reduced before fuel is injected to the engine. Once MAP is less than a threshold, fuel may be injected to the engine and the engine may generate net zero torque via adjusting spark timing in the presence of small engine air-fuel mixtures in the engine's cylinders. Further, exhaust valve timing may be advanced so that exhaust gases have less opportunity to generate torque and more opportunity to heat components of an exhaust system. The engine may be of the type shown in FIG. 1. The engine may be included in a driveline as shown in FIG. 2 or in another known hybrid driveline configurations (e.g., series or parallel). The engine may be started as shown in the sequence of FIG. 3 according to the method of FIG. 4.

Figure 1:
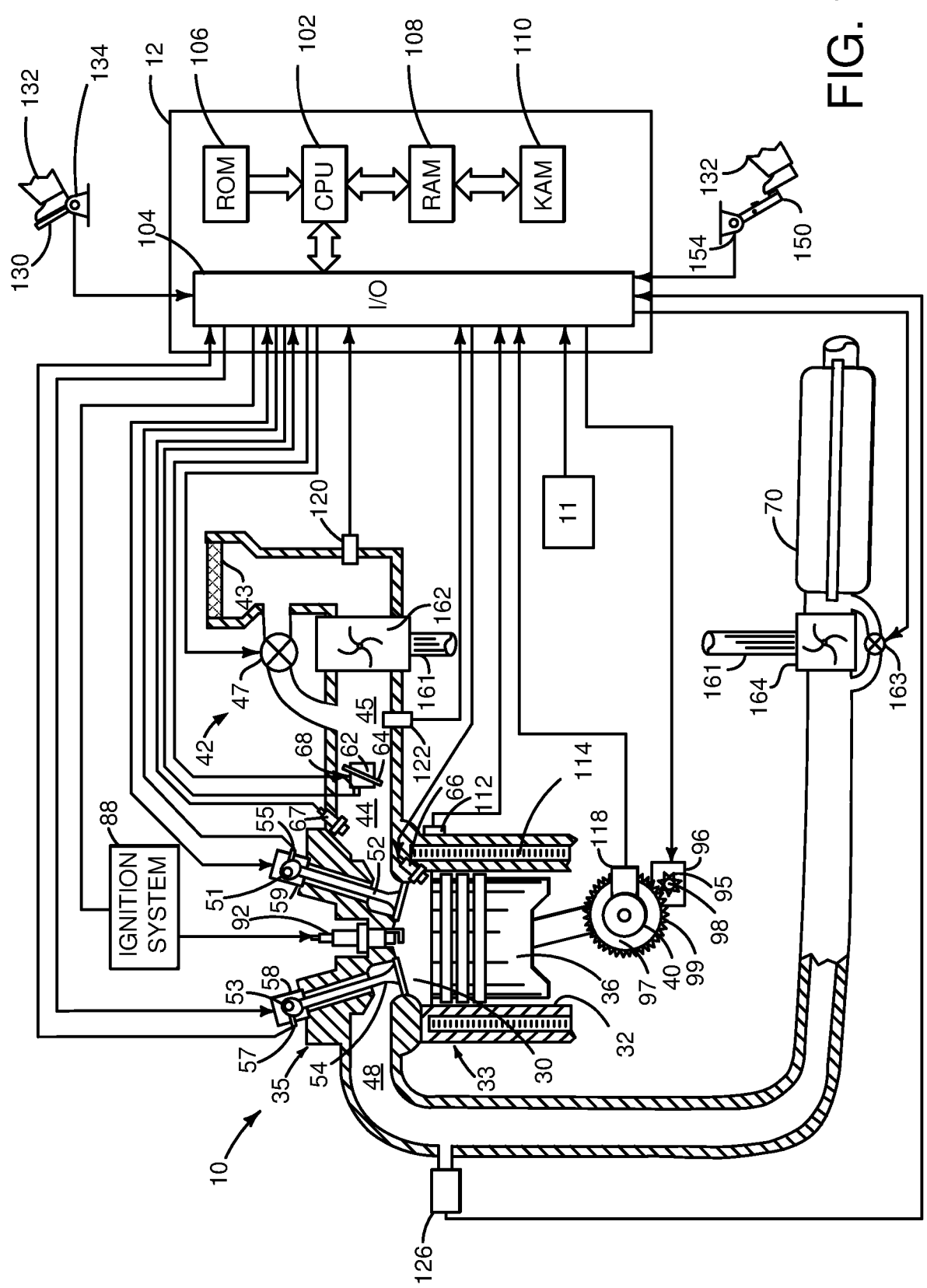
FIG. 1 is a schematic diagram of an engine.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2. The controller employs the actuators shown in FIGS. 1 and 2 to adjust engine and driveline or powertrain operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Optional starter 96 may be directly mounted to the front of the engine or the rear of the engine. In some examples, starter 96 may selectively supply power to crankshaft 40 via a belt or chain. In addition, starter 96 is in a base state when not engaged to the engine crankshaft 40 and flywheel ring gear 99.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electromechanical devices.

Direct fuel injector 66 is shown positioned to inject fuel directly into cylinder 30, which is known to those skilled in the art as direct injection. Port fuel injector 67 is shown positioned to inject fuel into the intake port of cylinder 30, which is known to those skilled in the art as port injection. Fuel injectors 66 and 67 deliver liquid fuel in proportion to pulse widths provided by controller 12. Fuel is delivered to fuel injectors 66 and 67 by a fuel system (not shown) including a fuel tank, fuel pump, and fuel rail (not shown).

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of three-way catalyst 70. Alternatively, a two-state exhaust gas oxygen sensor may be substituted for UEGO sensor 126.

Catalyst 70 may include multiple bricks and a three-way catalyst coating, in one example. In another example, multiple emission control devices, each with multiple bricks, can be used.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start or stop the engine or vehicle may be generated via a human and input to the human/machine interface 11. The human/machine interface 11 may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, first electric machine controller 252, second electric machine controller 257, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing a driver demand pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 2. For example, a single controller may take the place of vehicle system controller 255, engine controller 12, first electric machine controller 252, second electric machine controller 257, transmission controller 254, and brake controller 250. Alternatively, the vehicle system controller 255 and the engine controller 12 may be a single unit while the electric machine controller 252, the transmission controller 254, and the brake controller 250 are standalone controllers.

In this example, powertrain 200 may be powered by engine 10 and electric machine 240. In other examples, engine 10 may be omitted. Engine 10 may be started with an engine starting system shown in FIG. 1, via belt integrated starter/generator BISG 219, or via driveline integrated starter/generator (ISG) 240 also known as an integrated starter/generator. A temperature of BISG 219 may be determined via optional BISG temperature sensor 203. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

Driveline 200 is shown to include a belt integrated starter/generator (ISG) 219. ISG 219 may be coupled to crankshaft 40 of engine 10 via a belt 231. Alternatively, ISG 219 may be directly coupled to crankshaft 40. ISG 219 may provide a negative torque to driveline 200 when charging higher voltage electric energy storage device 262 (e.g., a traction battery). ISG 219 may also provide a positive torque to rotate driveline 200 via energy supplied by lower voltage electric energy storage device (e.g., a battery or capacitor) 263. In one example, electric energy storage device 262 may output a higher voltage (e.g., 48 volts) than electric energy storage device 263 (e.g., 12 volts). DC/DC converter 245 may allow exchange of electrical energy between high voltage bus 291 and low voltage bus 292. High voltage bus 291 is electrically coupled to inverter 246 and higher voltage electric energy storage device 262. Low voltage bus 292 is electrically coupled to lower voltage electric energy storage device 263 and sensors/actuators/accessories 279. Electrical accessories 279 may include but are not limited to front and rear windshield resistive heaters, vacuum pumps, climate control fans, and lights. Inverter 246 converts DC power to AC power and vice-versa to enable power to be transferred between ISG 219 and electric energy storage device 262. Likewise, inverter 247 converts DC power to AC power and vice-versa to enable power to be transferred between ISG 240 and electric energy storage device 262.

An engine output power may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 262 in a regeneration mode. ISG 240 is in electrical communication with energy storage device 262. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 262 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power directly transferred to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

A frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure. A braking torque may be determined as a function of brake pedal position.

In response to a request to increase a speed of vehicle 225, vehicle system controller may obtain a driver demand power or power request from a driver demand pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 262, a charging power (e.g., a negative ISG power) may be requested while a non-zero driver demand power is present. Vehicle system controller 255 may request increased engine power to overcome the charging power to meet the driver demand power.

In response to a request to reduce a speed of vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 262, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290

(e.g., a human/machine interface device). Gear shift selector 290 may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Thus, the system of FIGS. 1 and 2 provides for a system, comprising: an engine; an electric machine; and a controller including executable instructions stored in non-transitory memory that cause the controller to rotate the engine unfueled at a speed via the electric machine while an intake manifold pressure of the engine is less than a threshold, and executable instructions to supply fuel to the engine and combust the fuel in the engine while the intake manifold pressure is less than the threshold in response to an engine start request, while the electric machine rotates the engine at the speed, and while the engine is generating insufficient torque to maintain the engine at the speed. The system further comprises additional instructions to adjust engine torque via adjusting engine valve timing while supplying fuel to the engine. The system further comprises additional instructions to further comprising additional instructions to adjust engine torque via adjusting engine spark timing while supplying fuel to the engine. The system further comprises additional instructions to rotate the engine while the engine is generating insufficient torque to maintain the engine speed while a temperature is less than a threshold temperature. The system includes where the temperature is an exhaust gas temperature or a catalyst temperature. The system further comprises additional instructions to increase engine torque in response to the temperature exceeding the threshold temperature. The system further comprises additional instructions to propel a vehicle via the electric machine.

Figure 4:
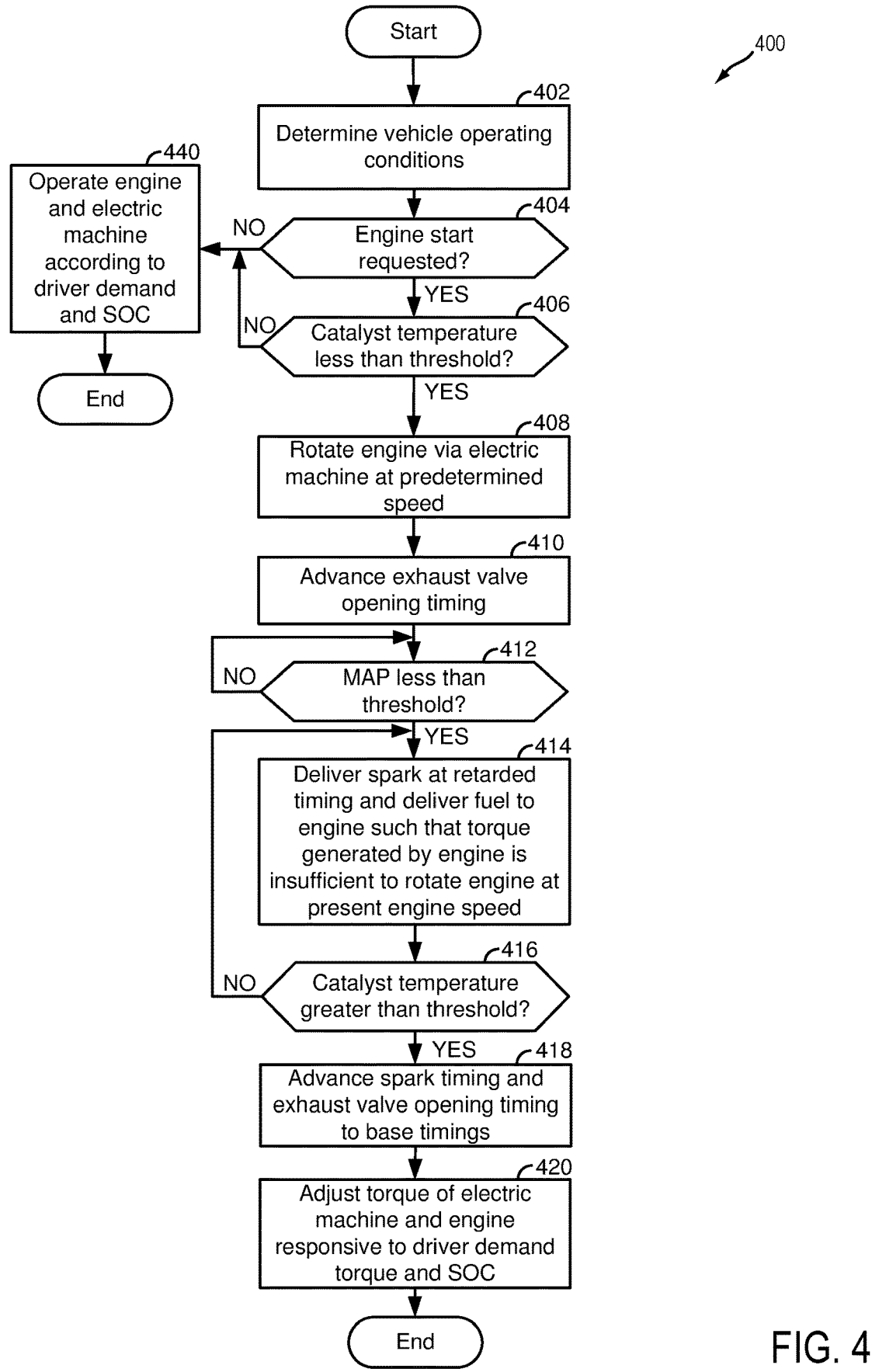
FIG. 4 shows an example method for starting an engine of the type shown in FIG. 1.

Referring now to FIG. 3, an example prophetic engine starting sequence according to the method of FIG. 4 is shown. The example sequence may be provided by the system of FIGS. 1 and 2 in cooperation with the method of FIG. 4. The plots are aligned in time and occur at a same time. The vertical lines at t0-t4 indicate times of particular interest.

The first plot from the top of FIG. 3 is a plot of engine rotation state versus time. The vertical axis represents engine rotation state and the engine is not rotating when the engine rotating state trace 302 is at a lower level near the horizontal axis. The engine is rotating when trace 302 is at a higher level near the vertical axis arrow. The horizontal axis represents time and the time increases from the left side of the figure to the right side of the figure. Trace 302 represents the engine rotation state.

The second plot from the top of FIG. 3 is a plot of catalyst temperature versus time. The vertical axis represents catalyst temperature and catalyst temperature increases in the direction of the vertical axis arrow. The horizontal axis represents time and the time increases from the left side of the figure to the right side of the figure. Trace 304 represents the catalyst temperature. Horizontal line 350 represents a catalyst light-off temperature.

The third plot from the top of FIG. 3 is a plot of engine spark timing versus time. The vertical axis represents engine spark timing and engine spark timing is at top-dead-center compression stroke of the cylinder receiving the spark when trace 306 is at the level of the horizontal axis. Spark timing of the cylinder receiving the spark is in advance of top-dead-center compression stroke of the cylinder receiving the spark when trace 306 is above the horizontal axis. Spark timing of the cylinder receiving the spark is in retarded of top-dead-center compression stroke of the cylinder receiving the spark when trace 306 is below the horizontal axis. The horizontal axis represents time and the time increases from the left side of the figure to the right side of the figure. Trace 306 represents spark timing for each cylinder of the engine.

The fourth plot from the top of FIG. 3 is a plot of exhaust valve opening timing versus time. The vertical axis represents the exhaust valve opening timing of the engine and the exhaust valve opening timing advances in the direction of the vertical axis arrow. The horizontal axis represents time and the time increases from the left side of the figure to the right side of the figure. Trace 308 represents the exhaust valve opening time of the engine.

The fifth plot from the top of FIG. 3 is a plot of engine torque versus time. The vertical axis represents engine torque output (e.g., engine torque at the engine's crankshaft) and engine torque increases in the direction of the vertical axis arrow. The horizontal axis represents time and the time increases from the left side of the figure to the right side of the figure. Trace 310 represents the engine torque output. Horizontal line 352 represents an amount of engine torque needed to rotate the engine at engine idle speed. Thus, if engine torque is lower than the level of line 352 there is insufficient engine torque for the engine to rotate at engine idle speed under torque generated by the engine.

The sixth plot rom the top of FIG. 3 is a plot of electric machine torque versus time. The vertical axis represents electric machine torque output and electric machine torque output increases in the direction of the vertical axis arrow. The horizontal axis represents time and the time increases from the left side of the figure to the right side of the figure. Trace 312 represents the engine torque output.

At time t0, the engine is not rotating and the catalyst temperature is low. The engine is not operating so the engine spark timing is not indicated. The exhaust valve opening timing is relatively retarded and engine torque is zero. The electric machine torque is also zero.

At time t1, an engine start is requested (not shown) and the electric machine begins to rotate the engine. The catalyst temperature remains low and spark is not provided to the engine. Further, fuel is not injected to the engine (not shown). The exhaust valve opening timing is advanced so that exhaust gases may do less work to rotate the engine and hasten warm-up of the catalyst once fuel is injected to the engine. Engine output torque is zero and the electric machine torque increases so that the electric machine may rotate the engine.

Between time t1 and time t2, the engine rotates unfueled for more than one revolution of the engine. Spark is not delivered to the engine and the exhaust valve timing is advanced. In some examples, the intake valve timing may also be advanced (not shown) to reduce the air charge that enters a cylinder. Engine torque is zero and the electric machine provides torque to rotate the engine at a predetermined speed (e.g., an engine idle speed, which may be higher than a warm engine idle speed).

At time t2, the engine begins rotating as part of the engine starting sequence. The engine is rotated using the torque output of the BISG and torque output of the ISG. The torque output of the ISG is provided to the engine via at least partially closing the driveline disconnect clutch to increase the driveline disconnect clutch torque capacity. The engine state changes from stopped to rotating.

At time t3, the engine is supplied with spark and fuel. Combustion begins in the engine, but the engine generates less output torque than what is needed to rotate the engine at the engine idle speed. Therefore, the electric machine continues to provide torque to rotate the engine at the engine idle speed. The engine spark timing is retarded to lower engine output torque and exhaust valve timing is advanced to increase an amount of heat that is transferred from the engine to the catalyst. The catalyst temperature begins to increase.

Between time t3 and time t4, the electric machine continues to provide torque to rotate the engine and the engine continues to supply thermal energy from combustion to the catalyst. The air charge of the cylinders (not shown) remains at a low level so that the amount of fuel injected may be low, thereby reducing engine emissions.

At time t4, the catalyst temperature exceeds threshold 350 so engine spark timing is advanced and engine exhaust valve opening time is retarded to increase engine torque output and reduce the amount of thermal energy that is delivered to the catalyst. The engine begins to produce torque that is sufficient to maintain engine speed at engine idle speed shortly after time t4. Therefore, the electric machine torque is reduced to zero. The engine continues to combust air and fuel while rotating under its own power.

Thus, a significant portion of fuel that is injected to an engine may be applied to heat a catalyst without the engine generating sufficient torque to rotate the engine at engine idle speed or another predetermined speed. Consequently, engine tailpipe emissions may be reduced and the engine may rotate smoothly at idle speed.

Turning now to FIG. 4, a flowchart of a method for operating an engine is shown. In particular, the method of FIG. 4 may be applied to start and operate an engine. The method of FIG. 4 may be incorporated into and may cooperate with the system of FIGS. 1-2. Further, at least portions of the method of FIG. 4 may be incorporated as executable instructions stored in non-transitory memory while other portions of the method may be performed via a controller transforming operating states of devices and actuators in the physical world.

At 402, method 400 determines vehicle operating conditions. Vehicle operating conditions may be determined from the vehicle's various sensors and actuators. The vehicle operating conditions may include, but are not limited to engine speed, vehicle speed, driver demand torque, ambient air temperature, barometric pressure, and engine load. Method 400 proceeds to 404.

At 404, method 400 judges if an engine start has been requested. Method 400 may judge that an engine start is requested from input by vehicle occupants (e.g., applying a pushbutton or key switch) or based on vehicle operating conditions (e.g., driver demand torque. battery state of charge, vehicle speed, etc.). If method 400 judges that an engine start is requested, the answer is yes and method 400 proceeds to 406. Otherwise, the answer is no and method 400 proceeds to 440.

At 440, method 400 operates the vehicle's engine and electric machines that may provide propulsive effort to the vehicle according to driver demand and battery state of charge (SOC). Method 400 may also operate the engine and electric machines responsive to other vehicle operating conditions. For example, if an engine start is requested the engine is started via supplying spark and fuel to the engine. If the engine is already started, engine torque and speed may be based on driver demand torque, vehicle speed, and battery state of charge. Further, electric machine torque and speed may be based on driver demand torque, vehicle speed, and battery state of charge. For example, at high driver demand torque levels, the engine and the electric machine may provide torque to the vehicle driveline while battery SOC is greater than a threshold. If driver demand torque is low and SOC is high, the electric machine may propel the vehicle while the engine is stopped. If SOC is low, the engine may provide torque to the electric machine and the electric machine may convert the torque into electric charge. The electric charge may be stored in the battery. Method 400 proceeds to exit.

At 406, method 400 judges if a temperature of a catalyst is greater than a threshold temperature. In one example, the threshold temperature may be a light-off temperature of the catalyst. If so, the answer is yes and method 400 proceeds to 408. Otherwise, the answer is no and method 400 proceeds to 440.

At 408, method 400 rotates the engine via an electric machine (e.g., 240 or 219) at a predetermined speed without supplying fuel to the engine. In one example, method 400 may rotate the engine at an engine idle speed (e.g., 800 revolutions/minute (RPM)). In another example, method 400 may rotate the engine at an engine cranking speed (e.g., 250 RPM). Method 400 proceeds to 410.

At 410, method 400 advances exhaust valve opening timing so that the engine may be prepared to release combustion gases into the exhaust manifold relatively early during a power stroke so that the catalyst may be heated more quickly and so that less work may be performed on the engine's crankshaft. For example, method 440 may advance exhaust valve opening timing for a cylinder that is releasing its exhaust gases to 110 crankshaft degrees after top-dead-center compression stroke of the cylinder that is releasing its exhaust gases. In addition, method 400 may advance intake valve timing of the engine so that smaller air charges may be held in engine cylinders when combustion begins in the engine. Method 400 proceeds to 412.

At 412, method 400 judges if MAP is less than a threshold pressure. If so, the answer is yes and method 400 proceeds to 414. Otherwise, the answer is no and method 400 remains at 412. Engine throttle position may be adjusted to achieve a desired MAP. For example, the throttle may be closed to decrease MAP or opened to increase MAP.

At 414, method 400 delivers spark and fuel to engine cylinders. In addition, if the engine is rotating at a speed that is less than engine idle speed, the engine speed may be increased to engine idle speed before spark and fuel are delivered to the engine. The spark is delivered at a timing that is retarded from a base spark timing for the engine's present speed and load. For example, if the engine is rotating at 800 RPM and 0.1 load, base spark timing may be 10 crankshaft degrees before top-dead-center compression stroke for each of the engine's cylinders. However, spark timing at 414 may be delivered 10 after top-dead-center compression stroke for each of the engine's cylinders to reduce work that is performed by combustion on the engine's crankshaft and increase heat that is delivered to the catalyst.

Method 400 may also deliver the fuel using split injection. In other words, method 400 may inject fuel twice into a cylinder for each cycle of the cylinder. For example, method 400 may inject fuel to a cylinder once during an intake stroke of the cylinder and once during a compression stroke of the cylinder for each cycle of the cylinder. Alternatively, method 400 may inject fuel a first time during a compression stroke of the cylinder and a second time during the compression stroke of the cylinder.

Additionally, operation of the engine may be adjusted such that the engine cannot rotate at its present speed with only torque that is produced from combustion in the engine's cylinders. In other words, the electric machine continues to provide torque to the driveline to rotate the engine at its present speed. For example, if X Newton-meters of torque are needed to rotate the engine at the present engine speed, torque generated by the engine is less than X. In some examples, the net torque generated by the engine's crankshaft may be zero or less than zero. Engine torque may be controlled via adjusting valve timing, amount of fuel injected, and spark timing. Method 400 proceeds to 416.

At 416, method 400 judges if a temperature of the catalyst is greater than a threshold. Alternatively, method 400 may judge if a temperature of exhaust gases is greater than a threshold. In still other embodiments, method 400 may judge if a temperature of another exhaust system component is greater than the threshold temperature. If method 400 judges that one of the aforementioned conditions is present, the answer is yes and method 400 proceeds to 418. Otherwise, the answer is no and method 400 returns to 414.

At 418, method 400 advances spark timing of the engine. In addition, method 400 may retard valve timing of the engine. The adjustments to spark timing and valve timing may cause the engine to generate additional torque. The additional torque may allow the engine to rotate under its own power. Method 400 proceeds to 420.

At 420, method 400 adjusts the torque that is generated via the electric machine and engine responsive to the driver demand torque. In particular, engine torque and electric machine torque and speed may be based on driver demand torque, vehicle speed, and battery state of charge. For example, at high driver demand torque levels the engine and the electric machine may each provide a portion of the driver demand torque to the vehicle driveline while battery SOC is greater than a threshold. Thus, if the driver demand torque is 400 Newton-meters (Nm), the engine may output 350 Nm and the electric machine may output 50 Nm to meet the requested 400 Nm. If driver demand torque is low and SOC is high, the electric machine may solely propel the vehicle while the engine is stopped. If SOC is low, the engine may provide torque to the electric machine and the electric machine may convert the torque into electric charge. The electric charge may be stored in the battery. Method 400 proceeds to exit.

In this way, an engine of a hybrid vehicle may be started to heat a catalyst and reduce tail pipe emissions. The engine cylinders may be operated with a small air charge and a reduced fuel charge to match the reduced air charge so that smaller amounts of exhaust emissions may be generated. Additionally, exhaust gases in the engine's cylinders may be released into the engine's exhaust manifold earlier so that more thermal energy from combustion may be transferred to the catalyst.

Thus, the method of FIG. 4 provides for a method for starting an engine, comprising: rotating the engine unfueled at a speed and generating an intake manifold absolute pressure of the engine less than a threshold in response to an engine start request, the engine rotated via an electric machine; and after rotating the engine unfueled at the speed, supplying an amount of fuel to the engine and combusting the amount of fuel while rotating the engine at the speed, while the intake manifold pressure is less than the threshold, and while controlling engine torque such that engine torque is insufficient to maintain the engine at the speed. The method further comprises supplying spark to a cylinder of the engine at a timing that is retarded from top-dead-center compression stroke of the cylinder. The method includes where the electric machine is a source of propulsive effort of a vehicle, and where rotating the engine unfueled comprises rotating the engine's crankshaft. The method includes where the speed is an engine idle speed that is greater than 250 revolutions per minute. The method includes where the amount of fuel supplied to the engine produces air-fuel mixtures in cylinders of the engine that are lean. The method includes where the amount of fuel is delivered to the engine in split fuel injections. The method further comprises increasing an amount of fuel injected to the engine in response to a temperature of a catalyst exceeding a threshold temperature. The method includes where the engine torque is controlled via adjusting engine valve timing.

The method of FIG. 4 also provides for a method for starting an engine, comprising: rotating the engine unfueled at a speed and generating an intake manifold absolute pressure of the engine less than a threshold in response to an engine start request, the engine rotated via an electric machine; and after rotating the engine unfueled at the speed, supplying an amount of fuel to the engine and combusting the amount of fuel while rotating the engine at the speed, while the intake manifold pressure is less than the threshold, and while controlling an engine output torque to substantially zero (e.g., less than 2% of rated engine torque) over an engine cycle. The method includes where the engine is rotated unfueled while a temperature is less than a threshold temperature, and where generating the intake manifold absolute pressure includes adjusting a position of a throttle. The method includes where the temperature is an exhaust gas temperature or a catalyst temperature. The method includes where the engine output torque is controlled via adjusting engine valve timing. The method further comprises increasing torque output of the engine in response to the temperature exceeding the threshold temperature.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A method for starting an engine, comprising:
rotating the engine unfueled at a speed and generating an intake manifold absolute pressure of the engine less than a threshold in response to an engine start request, the engine rotated via an electric machine, wherein spark is not delivered and exhaust valve timing is advanced while rotating the engine unfueled at the speed;
after rotating the engine unfueled at the speed, supplying an amount of fuel to the engine and combusting the amount of fuel while rotating the engine at the speed, while the intake manifold pressure of the engine is less than the threshold, and while controlling torque of the engine such that torque of the engine is insufficient to maintain the engine at the speed;
detecting a temperature of a catalyst has exceeded a threshold temperature; and
increasing torque output of the engine in response to the temperature of the catalyst exceeding the threshold temperature.

2. The method of claim 1, further comprising supplying spark to a cylinder of the engine at a timing that is retarded from top-dead-center compression stroke of the cylinder.

3. The method of claim 1, where the electric machine is a source of propulsive effort of a vehicle, and where rotating the engine unfueled comprises rotating a crankshaft of the engine.

4. The method of claim 1, where the speed is an engine idle speed that is greater than 250 revolutions per minute.

5. The method of claim 1, where generating the intake manifold absolute pressure includes adjusting a position of a throttle.

6. The method of claim 1, where the amount of fuel is delivered to the engine in split fuel injections.

7. The method of claim 1, wherein the threshold temperature is a light-off temperature of the catalyst, wherein the electric machine applies a torque to the engine to rotate the engine, and wherein the torque applied to the engine by the electric machine is reduced to zero responsive to the temperature of the catalyst exceeding the threshold temperature.

8. The method of claim 1, where the torque of the engine is controlled via adjusting engine valve timing.

9. A system, comprising:
an engine;
an electric machine; and
a controller including executable instructions stored in non-transitory memory that cause the controller to rotate the engine unfueled and without delivering spark at a speed via the electric machine and generate an intake manifold pressure of the engine less than a threshold, wherein spark is not delivered and exhaust valve timing is advanced while rotating the engine unfueled at the speed, and executable instructions to supply fuel to the engine and combust the fuel in the engine while the intake manifold pressure is less than the threshold in response to an engine start request, while the electric machine rotates the engine at the speed, and while the engine is generating insufficient torque to maintain the engine at the speed, and then increase engine torque in response to a temperature of a catalyst exceeding a threshold temperature.

10. The system of claim 9, further comprising additional instructions to adjust engine torque via adjusting engine valve timing while supplying fuel to the engine.

11. The system of claim 10, further comprising additional instructions to adjust engine torque via adjusting engine spark timing while supplying fuel to the engine.

12. The system of claim 9, further comprising additional instructions to rotate the engine while the engine is generating insufficient torque to maintain the speed while the temperature is less than the threshold temperature.

13. The system of claim 9, further comprising additional instructions to propel a vehicle via the electric machine.

14. A method for starting an engine, comprising:
rotating the engine unfueled at a speed and generating an intake manifold absolute pressure of the engine is less than a threshold in response to an engine start request, the engine rotated via an electric machine, wherein spark is not delivered and exhaust valve timing is advanced while rotating the engine unfueled at the speed;
after rotating the engine unfueled at the speed, supplying an amount of fuel to the engine and combusting the amount of fuel while rotating the engine at the speed, while the intake manifold absolute pressure is less than the threshold, and while controlling an engine output torque to substantially zero over an engine cycle; then
determining a temperature has exceeded a threshold temperature, where the temperature is a catalyst temperature; and
increasing the engine output torque in response to determining the temperature has exceeded the threshold temperature.

15. The method of claim 14, where the engine is rotated unfueled while the temperature is less than the threshold temperature, and where generating the intake manifold absolute pressure includes adjusting a position of a throttle.

16. The method of claim 15, where the engine output torque is controlled via adjusting engine valve timing and throttle opening amount.

17. The method of claim 1, wherein the torque output of the engine is increased such that the torque output of the engine is sufficient to maintain the engine at the speed when increasing the torque output of the engine in response to the temperature of the catalyst exceeding the threshold temperature.

18. The method of claim 1, wherein exhaust valve timing is advanced while supplying the amount of fuel to the engine and combusting the amount of fuel while rotating the engine at the speed, while the intake manifold pressure of the engine is less than the threshold, and while controlling torque of the engine such that torque of the engine is insufficient to maintain the engine at the speed.

19. The system of claim 9, wherein the engine torque is increased such that the engine is generating sufficient torque to maintain the engine at the speed when increasing the engine torque in response to the temperature of the catalyst exceeding the threshold temperature.

20. The method of claim 14, wherein the engine output torque is increased such that the engine is generating sufficient torque to maintain the engine at the speed when increasing the engine output torque in response to determining the temperature has exceeded the threshold temperature.

* * * * *